Feb. 18, 1936.  H. A. GERLAND  2,031,365
MACHINE FOR MAKING PRETZELS
Filed Oct. 12, 1934  4 Sheets-Sheet 1
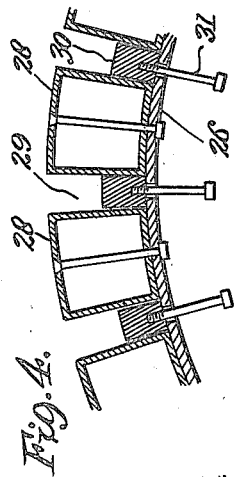
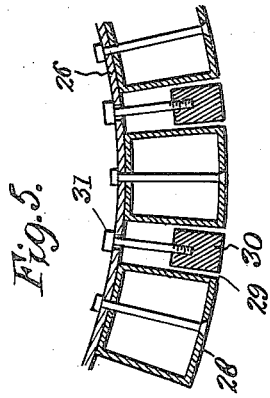
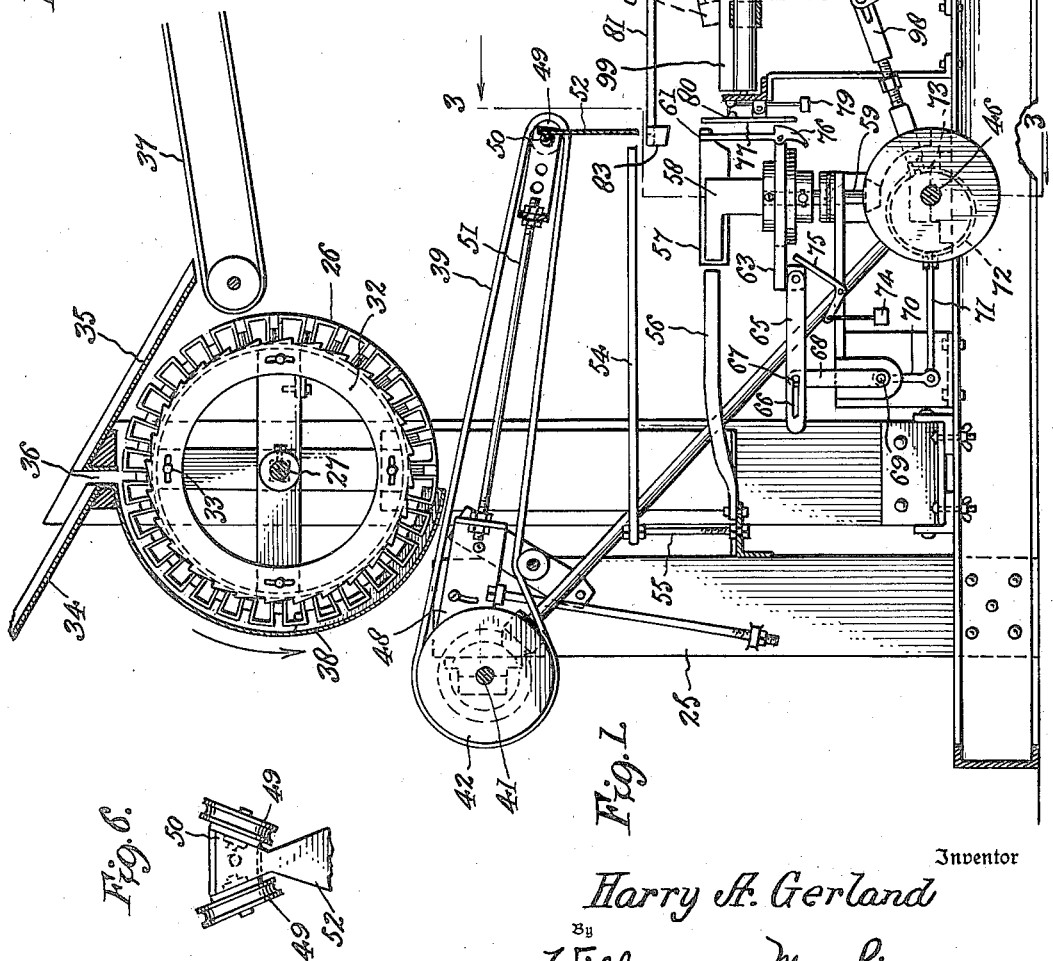
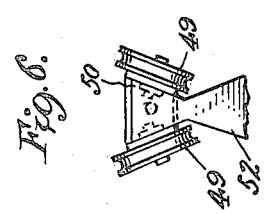
Inventor
*Harry A. Gerland*
By
*Wilkinson & Mawhinney*
Attorneys.

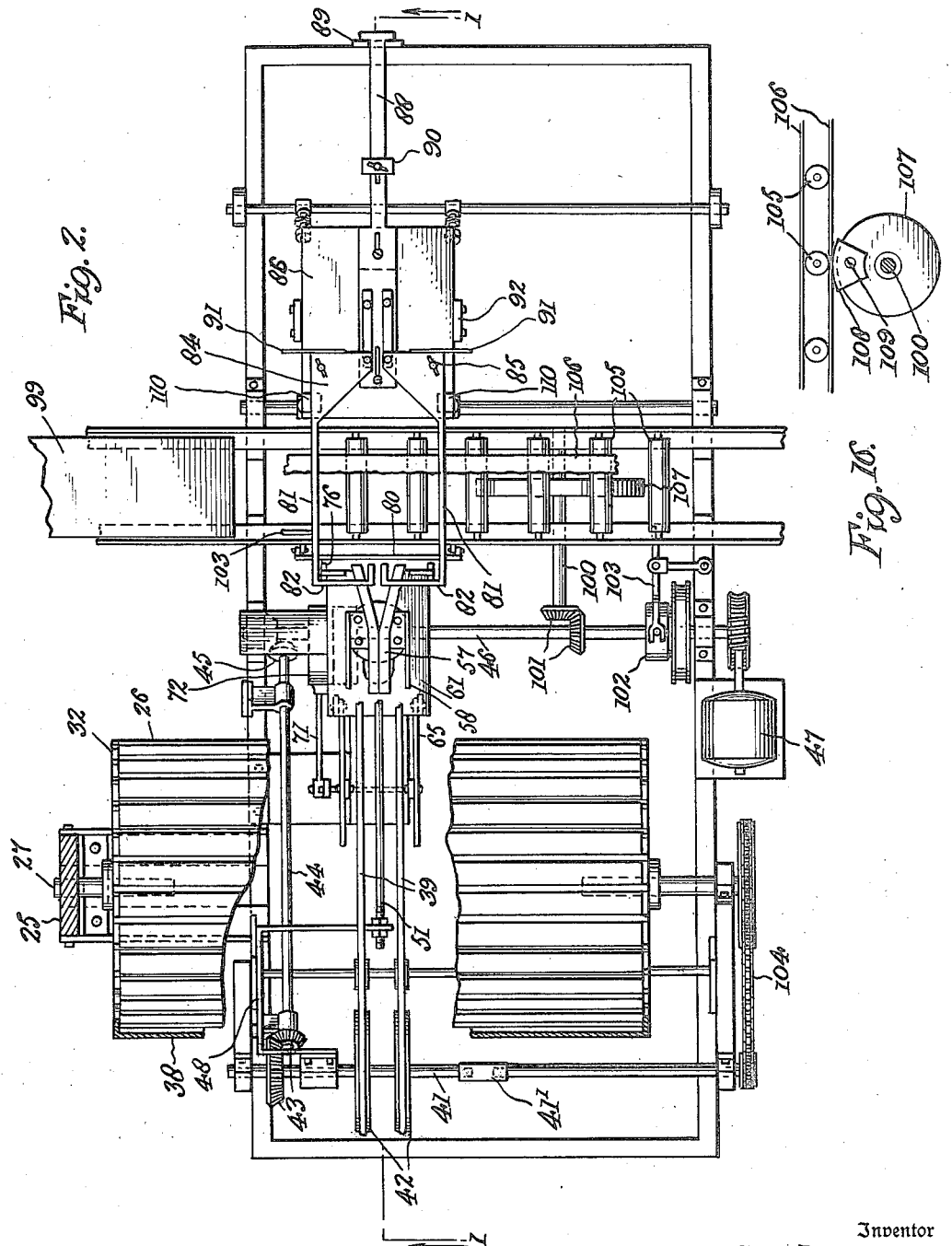

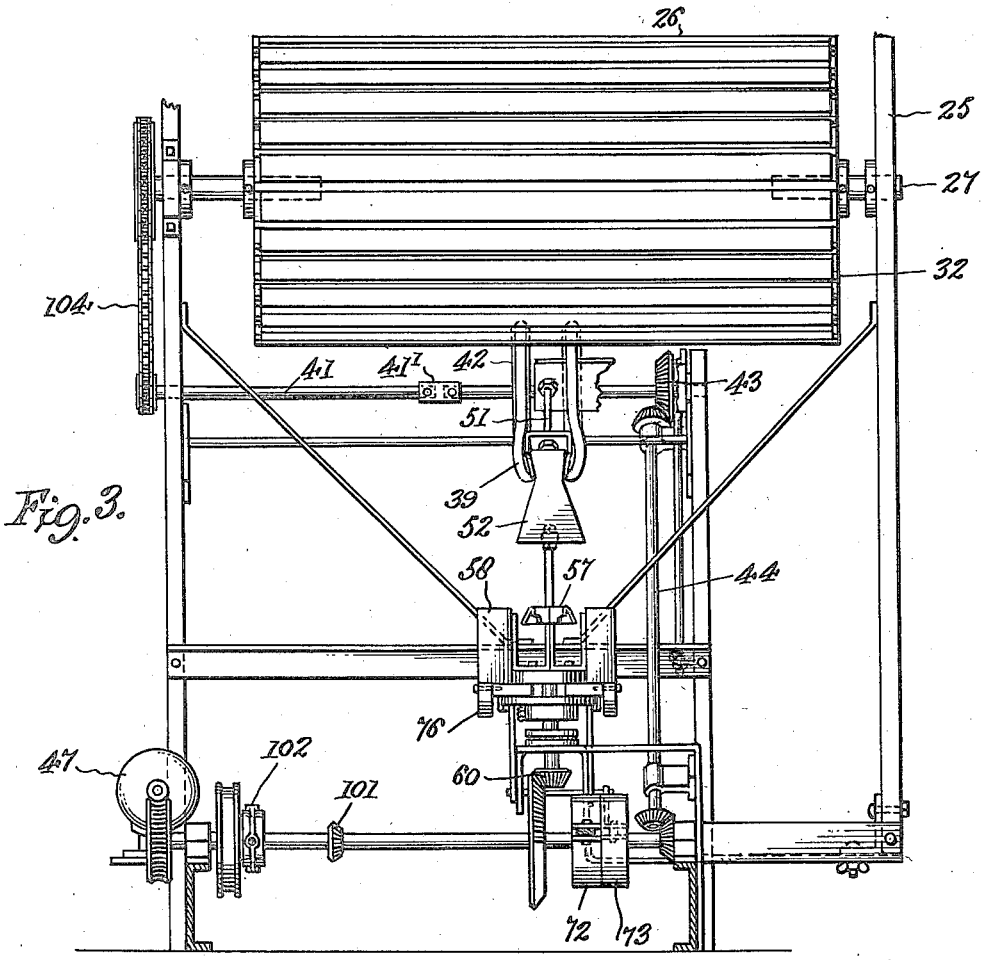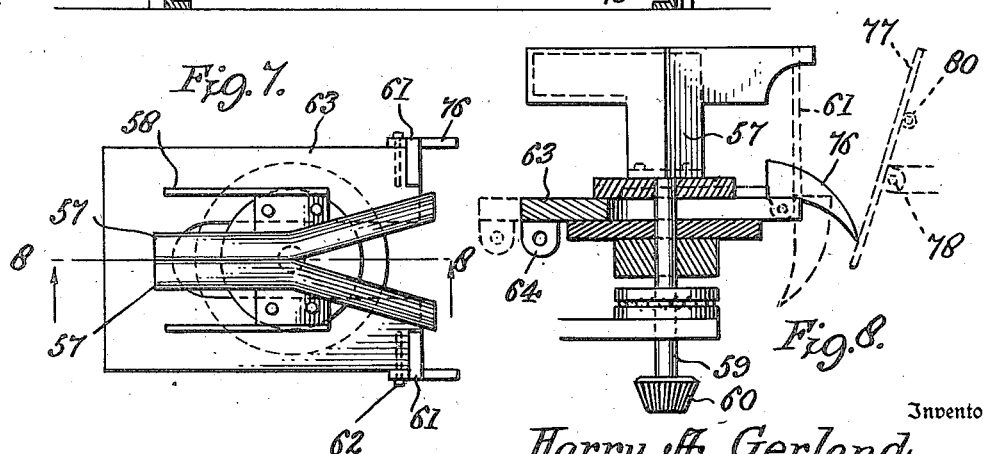

Feb. 18, 1936.   H. A. GERLAND   2,031,365
MACHINE FOR MAKING PRETZELS
Filed Oct. 12, 1934   4 Sheets-Sheet 4
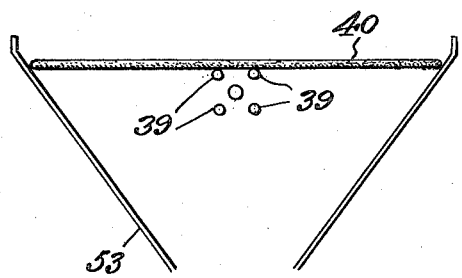
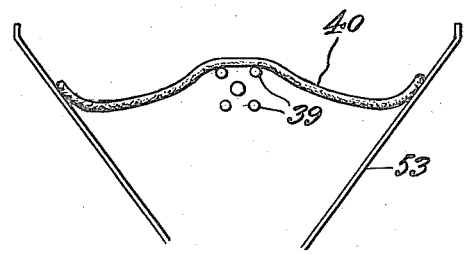
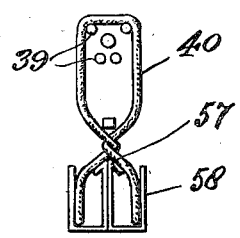
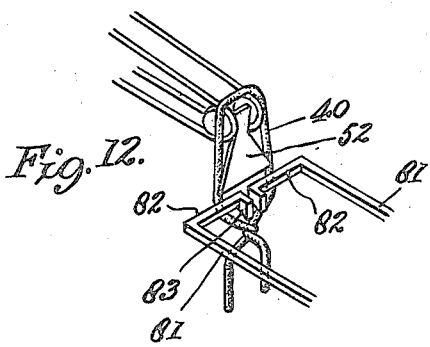
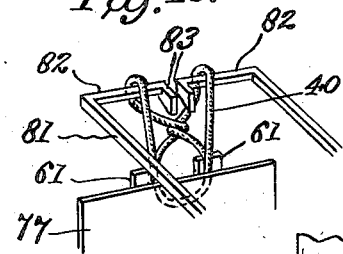
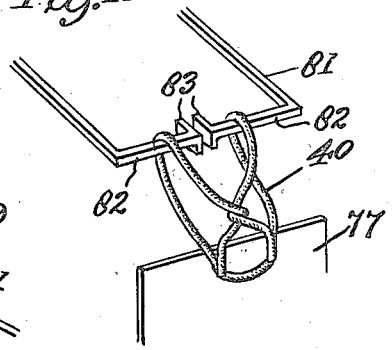
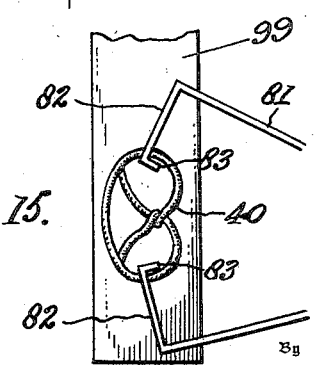
Inventor
Harry A. Gerland
By Wilkinson & Mawhinney
Attorneys.

Patented Feb. 18, 1936

2,031,365

UNITED STATES PATENT OFFICE 2,031,365

MACHINE FOR MAKING PRETZELS

Harry A. Gerland, Baltimore, Md.

Application October 12, 1934, Serial No. 748,126

5 Claims. (Cl. 107—8)

The present invention relates to a machine for automatically making pretzels, and has for an object to provide a machine for accomplishing this purpose by a succession of time movements simulating natural movements in the twisting, bending and overturning of the dough during the forming of the same into a pretzel.

Another object of the invention is to provide a machine embodying these characteristics and which is adjustable so as to vary the shape and size of the pretzel produced, and wherein the various operations are carried out by a relatively simple and inexpensive mechanism capable of being operated by a relatively small motor or the like and which cannot easily get out of order, and which may be easily maintained in a clean and sanitary condition.

The invention also embodies an improved method of manufacturing pretzels embodying but relatively few steps or operations, and wherein the twisting and folding is carried on at predetermined times during the practice of the method and during the continuous forward movement or advancement of the pretzel consecutively to the various stages of operation.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section on the line 1—1 of Figure 2 of a pretzel making machine constructed according to the present invention.

Figure 2 is a top plan view of the same, parts being broken away.

Figure 3 is a transverse section taken through the intermediate portion of the machine on the line 3—3 of Figure 1.

Figure 4 is a fragmentary enlarged sectional view taken through the feeding drum at its periphery and when in its uppermost position for receiving strips of dough.

Figure 5 is a similar view showing the peripheral portion of the drum at the lower side thereof with the ejector means extended after discharging the strips from the drum.

Figure 6 is a fragmentary enlarged view of the lower or forward end of the carrying belt or conveyor for the pretzel strips.

Figure 7 is a detail top plan view of the twister mechanism.

Figure 8 is a longitudinal section taken on the line 8—8 of Figure 7.

Figure 9 is a diagrammatic view showing the step in the method where the strip of dough is deposited on the carrier.

Figure 10 is a similar view showing the ends of the dough strip falling and guided downwardly into position beneath the carrier.

Figure 11 is a diagrammatic view showing the dough strip still on the carrier and with its intermediate portion twisted and with its free ends spread apart ready for subsequent operation.

Figure 12 is a perspective view showing diagrammatically the looped strip about to leave the carrier and showing the loop spreading means.

Figure 13 is a perspective view showing the loop turned down about the loop spreading means and with the closed end of the loop in contact with the free ends of the strip.

Figure 14 is a like view, reversed, showing the loop spreading means in operation.

Figure 15 is a top plan view of the completed pretzel showing the loop spreading means in position for freeing the formed pretzel, and Figure 16 is a fragmentary enlarged side elevation of the transverse conveyor, showing the intermittent advancing means therefor.

Referring now to the drawings, the machine is provided with a suitable frame 25 which comprises a desired number of standards, brackets and other parts found necessary to support the various mechanisms in their relative positions.

At one end of the frame a feed drum 26 is provided. The drum is mounted on an axle or shaft 27 by means of which the drum is turned in a desired direction, such as shown by the arrow in Figure 1, to advance the lower portion of the drum forwardly of the machine, or toward the opposite end of the frame 25. The drum 26 is provided with a plurality of partitions 28 which may be riveted or otherwise suitably secured in spaced relation about the drum 26 to provide a series of dough strip receiving compartments or recesses 29. In each recess 29 a follower 30 is mounted and this follower extends throughout the length of the drum and is guided and held from movement out of the recesses or pockets 29 by guide rods 31 suitably headed at their inner ends and which slide through the outer wall of the drum, as shown in Figures 4 and 5.

The followers 30 project sufficiently beyond the opposite ends of the drum for engagement with ratchet or cam teeth in the periphery of cam rings 32 adjustably secured by slots and bolts 33 to the opposite ends of the drum for limiting the inward radial movement of the followers 30. Thus, the recesses or pockets 29 are adjustable as to depth so as to accommodate a dough strip of desired size and to prevent entrance of more than one dough strip in each pocket. Thus followers 30 are adapted to fall by gravity from the inner positions, shown in Figure 4, to the outer positions, shown in Figure 5, so that the pockets when at the top of the drum may freely receive the dough strips and at the bottom of the drum the dough strips are ejected from the pockets by the followers 30.

The dough strips may be fed to the drum 26 in any suitable manner. A feed apron 34 suitably inclined for feeding the dough strips downwardly by gravity is disposed with its lower end over the top of the drum 26 while the second apron 35 may be offset upwardly from the lower end of the first drum 34 to provide a stop shoulder and a throat 36 for insuring the feeding of the dough strips downwardly into the pockets or recesses 29 of the drum. The apron 35 is inclined downwardly to carry off excessive numbers or amounts of the dough strips when the same are fed over the apron 34 at a greater rate of speed than the take up speed of the drum 26, and a conveyor or belt 37 may lead from the lower end of the second apron 35 to carry off the excess amount of dough strips to a second machine or to any other suitable point of disposal.

The rear side of the drum 26 is provided with a shield 38 which is carried by the frame 25 and lies in close proximity to the peripheral portion of the drum to house and protect the dough strips therein and to prevent the dough strips from falling out of the drum until they reach the lowermost portion thereof at the end of the shield 38. At this lowermost portion the dough strips are released from the drum 26 so as to fall in a relatively straight line position, as shown in Figure 9, and with the dough strip in substantially a horizontal plane. Intermediate the ends of the drum there is disposed a carrier 39 which preferably comprises a pair of closely spaced apart endless belts with their upper runs arranged to engage the intermediate portion of the dough strip 40 at spaced points to prevent the breaking or pulling of the dough strip and to leave the end portions thereof free. The endless belt or conveyor comprises a carrier and it is continuously driven from a shaft 41 mounted in the frame and carrying pulleys 42 over which the endless belts are trained. The shaft 41 is driven by suitable gearing 43 from a second shaft 44 which is connected by gears 45 to a drive shaft 46 operated by a motor 47 or the like, as shown in Figure 2.

The shaft 41 is mounted in a bracket 48 which is adjustably disposed upon the frame 25, and the forward ends of the endless belts are mounted upon a pair of pulleys 49 which are disposed in downwardly converging relation upon a bracket 50 supported adjustably upon a rod 51 which extends from the bracket 48 and which is provided with a spreader plate 52 which hangs down between the tilted or downwardly converging pulleys 49. The pulleys 49 are tilted so as to dispose the lower runs of the endless belts 39 relatively close together, as shown in Figure 11, to prevent contact of the free ends of the dough strip with the lower runs of the endless belts.

The free ends of the dough strip, as shown in Figure 10, are guided by the side plates 53 and held thereby against falling too rapidly. The guide plates 53 converge downwardly beneath the carrier so as to guide and bring the free ends of the dough strip toward each other and in parallel relation, as shown in Figure 11. The free ends of the dough strip 40 are adapted to be twisted at a point spaced considerably below the carrier 39, and the point of twist is determined by means of a central rod 54 which extends lengthwise beneath the carrier 39 and is supported adjustably upon a rod 55 or the like from the frame 25.

The free dangling ends of the strip 40 are brought into engagement with a guide 56 disposed lengthwise beneath the carrier 39 and which draws the free ends into definite relation for entrance into a pair of guide channels 57 which are disposed upon the upper end of a twister 58. The twister 58 comprises a disc mounted on a shaft 59 disposed beneath the forward end portion of the carrier 39 and upon the upper side of which is mounted the guides 57. The guides 57 register with the guide 56 and when the free ends of the dough strip 40 enter the channels or guides 57 the disc 58 is rotated by the shaft 59 through a pinion 60, shown in Figure 8, driven from the drive shaft 46.

The speeds of operation of the carrier 39 and the twister 58 are relatively proportioned so that the twisting action is accomplished during the passage of the pretzel strip over the twister 58.

As the twisting operation is completed the carrier 39 carries the dough strip with the upper portion in the form of a closed loop and with the free ends of the dough strip beneath the twisted portion thereof. The guides 57, as shown in Figures 2 and 7 particularly, are spaced apart a desired distance for holding the free ends of the strip spaced apart for the subsequent operation.

The carrier 39 terminates a short distance forwardly of the twister 57 and before the upper closed loop of the dough strip is released from the carrier a combined folding and spreading means is brought into engagement with the closed loop adjacent the twisted portion of the strip, as shown in Figure 12, so that the upper portion of the closed loop is carried forwardly of the folding and spreading means and permitted to swing downwardly and forwardly thereover to bring the upper end of the closed loop down against the free extremities of the strip, as shown in Figure 13. At the commencement of this folding operation of the closed loop a pressure plate 61 is raised into engagement with the rear sides of the free ends of the dough strip. The plate 61 may be of desired construction and configuration and lies at opposite sides of the twister 57 and is pivoted at its forward end by one or more pins 62 to a pusher plate 63 slidably mounted upon the frame beneath the twister disc 58 and suitably slotted to receive the twister shaft 59 therethrough so that the pusher plate 63 may reciprocate longitudinally beneath the twister. The pusher plate 63 is provided with an apertured lug 64 at its rear end to which is pivoted a link 65 having a longitudinal slot 66 at its rear end portion in which engages a pin 67 carried on the upper end of a crank arm 68 of a rocker shaft 69 mounted in the frame.

The rocker shaft 69 has a depending arm 70 to the lower end of which is pivoted a rod 71 carrying an eccentric strap 72 which engages an eccentric 73 mounted on the drive shaft 46. A weight 74 is connected by a bell crank lever 75 or the like to the lug 64 for normally urging the pusher plate 63 backwardly, the slot 66 in the link 65 permitting this movement with the desired rapidity during the operation of the rocker shaft 69. In Figure 1 the pusher plate 63 is shown in its forward position under operation of the rocker shaft 69, and the forward pivoted ends of the presser plate 61 are provided with cam heel portions 76 which are disposed with their forwardly advanced faces beyond the pivot 62 so as to engage the lower portions of a companion presser plate 77, as shown in Figure 8, for the purpose of raising the presser plate 61 into vertical position behind the dough strip and at the same time to swing the second presser plate 77 upwardly into alinement with the plate 61 for engagement against the forward side of the pretzel after the closed loop thereof has been folded downwardly.

The forward presser plate 77 is supported intermediate its upper and lower ends upon a pivot 78 and is normally urged into a forwardly and downwardly tilted position by a weight 79 which is hingedly connected at 80 to the upper portion of the plate 77, the weight 79 being disposed forwardly of the pivot 78, as shown in Figure 1.

Of course these weights 79 may be of any desired number and are preferably offset toward the opposite sides of the presser plate 77. The eccentric 73 is so disposed and proportioned relative to the drive shaft 46 that as the folding operation is being completed on the dough strip the pusher plate 63 is advanced forwardly to bring the presser plates 61 and 77 against the opposite sides of the folded or overturned strip, as shown in Figure 13, so as to press the same together, and the cam heels 76 of the presser plate 61 provide a spacing means to prevent injury to the plastic dough strip as the free ends thereof are pressed against and somewhat into the sides of the overturned closed loop of the strip.

The combined folding and spreading means comprises a pair of arms 81 which are spaced apart and disposed above the horizontal plane of the twister 57 and adjacent to the lower end of the depending plate 52 of the carrier. These arms 81 extend rearwardly and at their rear ends are provided with inwardly extending fingers 82 which terminate in closely spaced relation at their free ends so as to lie substantially beneath the plate 52 and they serve as rods or supports for receiving the opposite sides of the closed loop of the dough strip as the latter is discharged at its upper end from the carrier 39. The upper end of the closed strip swings forwardly from the carrier and pivots about the fingers 82 as the loop is swung downwardly to engage the free ends of the strip, as shown clearly in Figures 12 and 13.

The fingers 82 are provided with forwardly extending projections 83 on their free ends which lie at the inner sides of the side portions of the closed loop of the dough strip so that these projections 83 may engage the sides of the loop and draw it outwardly, such as shown in Figure 15.

The forward ends of the arms 81 are provided with annular portions or plates 84 which are pivotally and adjustably mounted upon pins 85 carried by a rocking plate 86 adapted to swing lengthwise in the frame. The inner ends of the angle projections 84 on the arms 81 are pivotally connected by means of a pair of links 87 to a reciprocating bar 88 which extends lengthwise from the rocking plate 86 and through a vertically slotted stationary stop bar 89 which rises from the frame 25. The reciprocating bar 88 has an adjustable stop lock 90 mounted thereon between the stop bar 89 and the forward end of the rocking plate 86 so that as the latter approaches the stop bar 89 the block 90 may engage the stop bar and hold the slide bar 88 from moving with the plate so as to slide forwardly with relation thereto and spread the forward ends of the arms 81. The forward ends of the arms 81 are provided with buffer springs 91 adapted to engage stops 92 carried by the plate 86 so as to yieldingly stop the outward swinging of the arms 81 and with a slight resilient or rebound action utilized for freeing the projections 83 from the sides of the dough strip.

In order to give the arms 81 and the fingers 82 the desired longitudinal and vertically swinging movement, the rocking plate 86 is pivotally connected at its forward end to an adjustable link 93 which is supported at its lower end upon a bracket 94 which rises from the bottom of the frame 25 so that the plate 86 at its forward end when reciprocated, is given a slight vertical movement during its longitudinal movement.

The forward end of the rocking plate 86 is connected to an adjustable arm 95 which is pivoted at its upper end to the plate 86 and at its lower end upon a rocker shaft 96 having an adjustable link 97 which is connected by a pin and slot connection with a rod 98 having an eccentric connection to the operating shaft 46 so as at times to rock the shaft 96 and swing the rocking plate 86 lengthwise of the machine.

The folding and spreading means, embracing the arms 81 and the rocking plate 86 with its parts, serves not only in the folding over of the looped dough strip, but also in the drawing of the sides of the loop outwardly under the strip as was subjected to the pressure plates 61 and 77 and at the same time pulling the folded and twisted dough strip from between the pressure plates, as shown in Figure 14, and releasing the finished strip so that it may be carried off for cooking.

For this purpose the machine may be provided with a transverse conveyor 99 of any suitable construction and which is preferably located beneath the arms 81 and immediately forward of the presser plates 61 and 77, as shown in Figures 1 and 2. The transverse conveyor 99 may be operated through a shaft 100 connected by gears 101 to the drive shaft 46, as shown in Figure 2, and the control of the machine may take place through a clutch 102 and a system of levers 103 leading to the opposite side of the machine where the finished dough strip is delivered for subsequent treatment.

The transverse conveyor 99 has a plurality of rollers 105 over which travels one or more belts 106 carrying the palette 99 or body board of the conveyor upon which the pretzel forms are deposited. The means for intermittently feeding or advancing the pallette comprises a disc 107 mounted on the shaft 100, and upon which is adjustably mounted a drive segment 108 by means of a set screw 109 or the like. The segment 108 upon each revolution of the disc 107 engages the belt 106 and advances the palette 99 a distance equal to the length of the segment and which is proportioned to the time interval between the handling of each dough strip. Thus for each pretzel the palette is advanced one step and this operation is continuous until the palette is filled when the lever 103 is released and the clutch 102 thrown out to stop the machine.

When the machine is stopped the feeding and conveying devices 35 and 37 carry off the dough strips which are not taken up by the feed drum. As soon as a new palette is placed on the conveyor 99 the lever 103 is again engaged and the clutch 102 starts the machine in motion to continue the twisting and folding operations in the dough strips.

The feed drum 26 may be operated in any suitable manner, such as by a chain and sprocket connection 104 with the rear transverse shaft 41, as shown in Figure 2. It will be noted that the bracket 48 is adjustable as well as the bracket 50 and that the various linkages and rocking arms are also adjustable so as to vary the proportions of the dough strip as to the formation of its loop and the like.

With reference now to Figures 9 to 15, it will be noted that during the operation of the machine the dough strip 40 is first deposited upon the rear upper end of the carrier 39 and that the free ends of the dough strip are permitted to fall or gravitate downwardly into substantially parallel relation by means of the guide plates 53, the plates preventing the strip from falling too rapidly and maintaining the free ends from coming together or sticking. The initial falling movement of the free ends of the dough strip is shown in Figure 10.

As the carrier 39 carries the dough strip forwardly in the machine the twister 57 receives the free ends of the strip and is at this time operated to give a complete turn or twist to the intermediate portion of the strip to provide an upper closed loop and a pair of spaced apart free ends. As shown in Figure 11, the dough strip thus twisted is ready for delivery from the forward end of the carrier 39. However, as shown in Figure 12, immediately prior to the delivery of the closed loop from the carrier, the arms 81 are moved backwardly beneath the plate 52 so that as the loop of the dough strip falls forwardly from the carrier it swings over the fingers 82 and the spreader plate 52 maintains the loop open as it falls over the fingers. While this is being effected, the pusher plate 61 is advanced forwardly and brings the presser plates 61 and 77 into position for receiving the overturned loop and the free ends of the dough strip. The presser plates are now forced together, as shown in Figure 1, so as to press the free ends of the strip into the closed loop, and then the pusher plate 61 is retracted so as to release the folded strip when the arms 81 are then brought into action. The arms 81 are swung forwardly and downwardly until the folded dough strip is free of the presser plates 61 and 77, as shown in dotted lines in Figure 1, and the projections 83 touch the palette 99. During the last phase of this movement the arms 81 are spread apart, and through the fingers 82 and projections 83, draw the loop of the dough pretzel into the laterally elongated shape desired.

The arms 81 move up on the cam blocks 110, as the latter diverge upwardly, and clear the fingers from the palette a distance at least equal to the thickness of the dough pretzel when the rebound of the spring arms 91 cause a slight movement of the arms 81 toward each other and the consequent release of the dough pretzel so that it remains in place on the palette.

At this time the arms have reached their outermost positions and the buffer springs 91 effect a slight rebound or loosening action of the arms and fingers with the result that the complete dough strip is released from the fingers and falls upon the transverse conveyor 99.

As shown in Figures 2 and 3 the shaft 41 may have a detachable coupling 41' near the carrier 39 to facilitate the renewal of the rubber or other type of conveyor belts used for renewing and cleaning the same.

What is claimed is:—

1. A pretzel making machine comprising a carrier for a rolled strip of dough to suspend the same with its free ends hanging from the carrier, a twister disposed beneath the carrier in the line of the free ends of the strip for engaging and twisting the same together to provide a closed loop on the carrier and spaced extremities beneath the twisted portions of the strip ends, combined folding and spreading means at the forward end of the carrier for engaging the strip above the twisted portion thereof and admitting the downward folding of the closed loop upon the free extremities of the strip, means for pressing the closed loop to the extremities, and means for operating said folding and spreading means to draw the loop laterally and shape the same and extract the folded and pressed strip from the pressing means.

2. A pretzel forming machine comprising a pair of spaced endless conveyors, means for depositing strips of rolled dough across the conveyors whereby the free ends of the dough strips are adapted to hang downwardly at opposite sides of the conveyors, a twisting device disposed beneath the conveyors for engaging the free ends of the dough strips for twisting the ends together and providing a closed loop, means for engaging the lower portion of the loop during operation of the conveyors for folding the loop over upon the twisted ends of the strip when the loop is discharged from the conveyors, and spreading means for engagement against the opposite sides of the folded loop to laterally extend the same.

3. A pretzel making machine comprising a feed drum having a plurality of longitudinally extending pockets therein, means for feeding strips to said drum at the top thereof, said pockets being proportioned to receive each a single strip, means for discharging the strips at the lower side of the drum, a pair of closely spaced apart conveyors arranged beneath the intermediate portion of the drum for receiving the strips therefrom, the free ends of the strips adapted to fall down at opposite sides of the conveyors, a twisting device beneath the conveyors adapted to receive the free ends of the strips and twist the same together to form an upper closed loop on the conveyors and lower free ends, folding fingers arranged beneath the discharge end of the conveyors for engaging the lower portion of the loop and about which the upper portion of the loop is adapted to swing when discharged from the conveyors, means for pressing the overturned loop against the extremities of the strip, and a combined discharging and laterally distending means for engaging the folded and pressed loop.

4. A pretzel making machine comprising a feed drum having a plurality of longitudinal pockets in its periphery for the reception of rolled dough strips, followers mounted in the pockets of the drum, adjustable means carried by the drum for limiting the retraction of the followers and the consequent size of the pockets, a shield at the lower side of the drum for maintaining the strips in said pockets until the end of the shield is reached, said followers adapted to insure the ejection of said strips from the pockets, a relatively narrow carrier operable beneath the drum for engaging the intermediate portions of the strips delivered from the drum, the free ends of the strips adapted to swing down at the opposite sides of the carrier, a twisting device disposed beneath the carrier for engaging the free ends of the strip and twisting the same together while supported on the carrier, folding means for engaging the twisted strip to overturn the same upon itself as the latter leaves the carrier, means for pressing the overturned portions of the strip together, and means for discharging the overturned and the pressed strip.

5. A pretzel making machine, comprising a support for receiving a rolled strip of dough thereover with the ends of the strip suspended at opposite sides of the support, a vertical axis twister disposed beneath the support for engaging and twisting the free ends of the strip together and providing a closed loop at the upper portion of the strip, vertical folding means for the strip operable thereon above the twisted ends thereof for folding downwardly the loop against one side of the free ends of the strip, and discharging and spreading means adapted to engage the sides of the downturned loop of the strip for removing the twisted and folded strip from the machine and for laterally spreading the loop with the strip ends adhering thereto.

HARRY A. GERLAND.